Patented Dec. 12, 1933

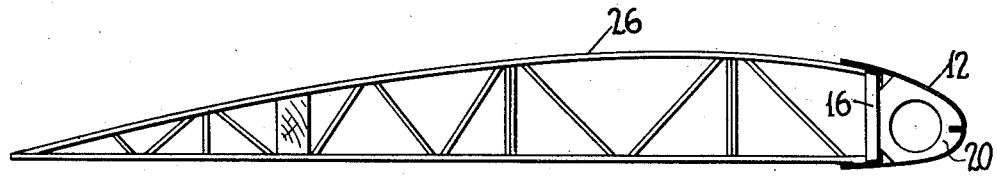
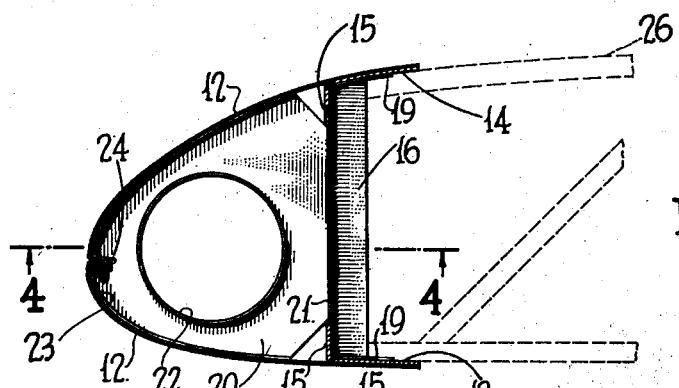

1,939,599

UNITED STATES PATENT OFFICE 1,939,599

AEROFOIL BEAM

Earl J. W. Ragsdale, Norristown, Pa., assignor to Edward G. Budd Mfg. Co., Philadelphia, Pa., a corporation of Pennsylvania Application August 13, 1931. Serial No. 556,773

3 Claims. (Cl. 244—31)

My invention pertains to the art of aircraft and it has been my object to form an improved nose section for aerofoils including a main front spar of composite relatively light gauge sheet metal construction. More particularly, I have sought to produce a composite metallic main front spar of relatively open design affording facility of securement of the parts thereof by spot welding or otherwise and affording further adequate means of securement to the skin of the aerofoil section and to the main body thereof lying rearwardly of the nose section.

A still further and perhaps the prime, object of my invention consists in forming a main front spar having integral reinforcing portions extending forwardly thereof into the very nose of the skin of the aerofoil section to integrally support and reinforce the same.

The manner in which I have achieved these and other objects of my invention will be obvious from a reading of the sub-joined specification in the light of the attached drawing, in which, Fig. 1 is a side elevation of an airplane rib illustrating the application of my improved nose beam thereto, Fig. 2 is a rear perspective view of my nose beam detached from other aerofoil parts, Fig. 3 is a transverse cross section on the line 3—3 of Fig. 2, and Fig. 4 is a longitudinal cross section on the line 4—4 of Fig. 3.

Referring to the drawing the nose section of my improved aerofoil is shown at the right hand side of Fig. 1 and views thereof are shown in full line in Figs. 2 and 3. This section consists of a nose beam surrounded by a skin 12 integrally united thereto by spot welding. The nose beam comprises a pair of chord members designated by the numerals 13 and 14 respectively, each of these chord members having main body portions abutting the lower and upper portions of the skin of the aerofoil respectively, and flanged portions 15 extending in opposite directions toward each other in a common plane. The chord members are interconnected by suitable webbing consisting of vertical beams 16 and diagonal beams 17. These beams are provided with side flanges 18 extending in the planes of the flanged portions 15 of the chord members and end flanges 19 extending in the planes of the main body portions of the chords. The respective beams are integrally connected through their flanges with the contacting chord parts by spot welding.

Reinforcing plates 20 are secured to the vertical beams by flanges 21 formed on the rear sides of these reinforcing plates, these flanges being welded to the longitudinal flanges upon the beams 16 as clearly illustrated at the lower side of Fig. 4. These reinforcing plates are provided with openings and are flanged at 22 about these openings to afford the necesary strength. The reinforcing plates extend forwardly into the very nose of the skin portions of the aerofoil and are peripherally flanged as indicated at 23, these peripheral flanges abutting the forward end of the skin portions and being preferably secured thereto by spot welding.

The reinforcing plates 20 are slitted at their forward ends at 24 to receive the inturned edges of the skin portions 12 which are turned inwardly into the slitted portions and preferably spot welded to each other through their inturned margins.

I have illustrated the application of my improved nose beam to a rib 26 of an airplane wing in Figs. 1 and 3. It will be readily seen that I have provided a nose beam for aerofoils of great strength and lightness formed of relatively thin gauge sheet metal parts integrally interconnected. It will be further seen that my improved design facilitates the assembly of the parts. The nose beam and skin surrounding it are formed separately from the main body of the wing and assembled therewith as a unit. The reinforcing plates 20 extend forwardly and thus brace the skin portion of the nose of the aerofoil, lending great strength and rigidity to the general construction. The flanging of these reinforcing plates constitute a backing plate for the channel section beams 16 also constitute an important feature of my invention, as it enables me to obtain a closed box section beam without the provision of separate backing plates for these beams.

Modifications will be obvious to those skilled in the art and I do not therefore wish to be limited except by the scope of my sub-joined claims as interpreted in the light of the generic spirit of my invention.

What I claim is:

1. A nose section for aerofoils including an outer skin portion, an angular chord member secured through one of its angular sides to said skin portion interiorly, a second chord member similarly connected to another portion of said skin member in opposed relationship to said first named chord member and webbing interconnecting said chord members to constitute a truss in combination therewith, the members constituting said webbing having flanges extending respectively into the planes of each of the angularly displaced sides of the chord members and secured thereto.

2. A nose section for aerofoils including an outer skin portion, an angular chord member secured through one of its angular sides to said skin portion interiorly, a second chord member similarly connected to another portion of said skin member in opposed relationship to said first named chord member, webbing inter-connecting said chord members to constitute a truss in combination therewith, the members constituting said webbing having flanges extending respectively into the planes of each of the angularly displaced sides of the chord members and secured thereto, and vertically disposed reinforcing plates extending from the webbing into the nose section, each of the said plates having in their forward edges, slits, and the said skin portion being divided into sections, edges of which sections are directed into the said slits interiorly of the said nose section.

3. A nose section for aerofoils including an outer skin portion, a vertical trussed beam interconnecting the top and bottom portions of said skin portion, and having vertical web members of forwardly presenting channel section, vertically disposed reinforcing plates extending forwardly into the nose section and supporting the skin in their edges, said plates being flanged in their rear edges and secured through said flanges across the mouths of the channel section web members.

EARL J. W. RAGSDALE.